Figure 1:
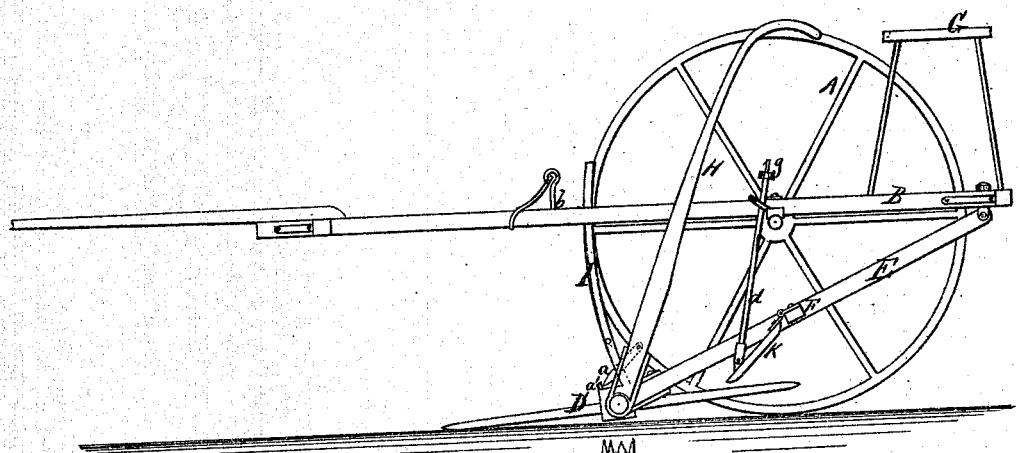
Figure 2:
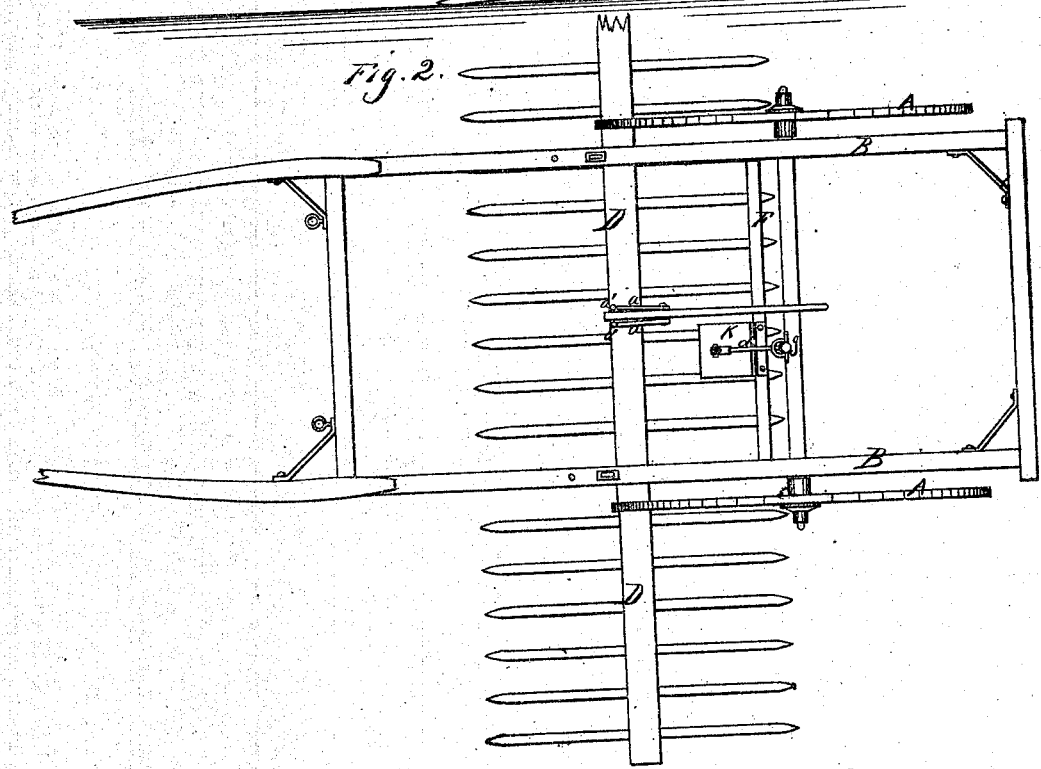

W. Sharkey,
Revolving Rake.

No. 97,708.

Patented Dec. 7, 1869.

Witnesses.
Geo. H. Strong.
J. L. Borne

Inventor.
William Sharkey
By his Atty. J. Dennis Jr

United States Patent Office.

WILLIAM SHARKEY, OF CHICO, CALIFORNIA.

Letters Patent No. 97,708, dated December 7, 1869.

IMPROVEMENT IN HORSE HAY-RAKES.

The Schedule referred to in these Letters Patent and making part of the same.

*To all whom it may concern:*

Be it known that I, WILLIAM SHARKEY, of Chico, county of Butte, State of California, have invented an Improved Revolving Sulky-Rake; and I do hereby declare the following description and accompanying drawings are sufficient to enable any person skilled in the art or science to which it most nearly appertains to make and use my said invention or improvements without further invention or experiment.

My invention relates to that class of revolving rakes which is attached to two-wheeled vehicles, commonly called sulkies, or it may be attached to other vehicles; and It consists in a device attached, which can be operated by the foot of the driver, and by means of which the teeth of the rake may be raised, so as to pass over any uncut or fouled grass, or other obstacle that may be in the way, and prevent its proper working.

In order to give a full and exact description of my invention, reference is had to the accompanying drawings, forming a part of my specification, in which—

A A are the two wheels of a sulky or other vehicle, and

B B, the two side timbers of the frame.

These timbers are extended in front of the wheels to the required distance, to allow the rake D to be revolved and operated in front of the wheels, the shafts inside of which the horse works, being attached to the front end of the timbers B.

The rake D is constructed in the usual manner, the teeth passing entirely through the rake-head.

Two connecting parallel arms, E E, are attached, one to the rear end of each of the timbers B, by means of some suitable loose joint or hinge, so as to allow the rake to be raised or lowered independent of the wheels while in operation, and thus readily accommodate itself to even or uneven ground.

The arms E extend forward of the wheels, and are attached to the rake-head by any suitable connection which will allow the rake to revolve.

A cross-bar, F, extends across from one of the arms E to the other, being mortised into them at each end, the whole forming a strong swinging frame-work, to which the rake D is attached.

The driver's seat G is attached to the frame of the sulky, behind the axle.

A lever, H, which is attached to the middle of the rake-head, extends upward, so as to be within easy reach of the driver, by means of which he may lift the rake over stumps, rocks, or other obstructions.

This lever carries two pawls, $a\ a$, at its lower end, which engage with projections $a'\ a'$ on the rake-head, so that, by lifting upward on the lever, the rake is raised to a proper elevation to cause the teeth to engage with the ground, and thus be revolved, releasing its load in the operation, after which the rake will be in a position to immediately commence raking again.

Secured to each of the arms E, near the rake-head, is a circular guide-rod, I, which passes upward through mortises in the timbers B.

At proper intervals along this guide-rod are made small holes, through which a pin or bolt, $b$, passes after the rake has been elevated to the desired height for travelling from one field to the other; they also serve to prevent the grass from crowding over upon the back teeth of the rake, and assist in guiding the driving-arms when the rake is revolving.

A plate, K, is hinged to the cross-timber F, and a rod, $d$, is secured to it, which extends upward through a staple in the axle of the vehicle, to the upper end of which is fixed a stirrup, $g$, which is within reach of the foot of the driver.

The plate K is of sufficient length to press lightly upon the back teeth of the rake, and when the front teeth come in contact with any locked or badly-cut grass, by pressing down upon the stirrup, they are elevated, and thus allowed to pass over without raking.

Having thus described my invention,

What I claim as new, and desire to secure by Letters Patent, is—

The combination and arrangement of the hinged plate K, rod $d$, and stirrup or foot-piece $g$, constructed to operate substantially as described, for the purpose set forth.

In witness whereof, I have hereunto set my hand and seal.

WILLIAM SHARKEY. [L. S.]

Witnesses:
EUGENE FOLGER,
JOHN L. BOONE.